United States Patent
Manyam et al.

(10) Patent No.: US 9,524,525 B2
(45) Date of Patent: Dec. 20, 2016

(54) METHOD, SYSTEM, AND GRAPHICAL USER INTERFACE FOR PRESENTING AN INTERACTIVE HIERARCHY AND INDICATING ENTRY OF INFORMATION THEREIN

(75) Inventors: Balamurali Krishna Manyam, Hyderabad (IN); Nagaraj M. Hunur, Hyderabad (IN); Vinayaka Vasanth Prabhu, Hyderabad (IN); Swati Jain, Delhi (IN); Vivek Borkar, Pune (IN); Rakesh Gajula, Hyderabad (IN); Vikas Kumar, Muzaffarnagar (IN); Ashton Kawanishi, Redwood City, CA (US); Adam Gates, Cornelius, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1668 days.

(21) Appl. No.: 12/113,089

(22) Filed: Apr. 30, 2008

(65) Prior Publication Data

US 2009/0276733 A1 Nov. 5, 2009

(51) Int. Cl.
*G06Q 40/08* (2012.01)
*G06Q 10/00* (2012.01)
*G06F 3/0482* (2013.01)
*G06F 3/0483* (2013.01)
*G06F 17/24* (2006.01)

(52) U.S. Cl.
CPC .............. *G06Q 40/08* (2013.01); *G06F 3/0482* (2013.01); *G06F 3/0483* (2013.01); *G06F 17/243* (2013.01); *G06Q 10/00* (2013.01)

(58) Field of Classification Search
CPC .... G06F 3/0483; G06F 3/0482; G06F 17/243; G06Q 10/00; G06Q 40/08

USPC ......................... 715/854, 855, 817
See application file for complete search history.

(56) References Cited

U.S. PATENT DOCUMENTS 5,644,740 A * 7/1997 Kiuchi ........................ 715/853
6,018,344 A * 1/2000 Harada et al. ................ 715/818
6,606,106 B1 * 8/2003 Mendenhall et al. ........ 715/854

(Continued)

OTHER PUBLICATIONS bing search q=task+step+hierarchy&src=IE-SearchB Nov. 12, 2015.*

*Primary Examiner* — Jeffrey A Gaffin
*Assistant Examiner* — John M Heffington
(74) *Attorney, Agent, or Firm* — Kilpatrick Townsend & Stockton LLP

(57) ABSTRACT

A method, computer system, and graphical user interface for presenting an interactive hierarchy and indicating entry of information therein is disclosed. An interactive hierarchy is used to organize information using nodes arranged in multiple levels, where the interactive hierarchy may also be used to select a node to operate on. The interactive hierarchy may provide sense-of-place by depicting the organization of the nodes and indicating which node a user is operating on. An indicator is also provided which indicates whether one or more types of information have been entered for a given node, level of nodes, etc., thereby providing sense-of-task by enabling a user to determine which types of information have already been entered, which types of information have yet to be entered, etc. Further, a task indicator may be provided for stepping users through various information entry and/or management tasks, thereby further improving sense-of-task.

24 Claims, 6 Drawing Sheets

(Continued)

(56) References Cited

U.S. PATENT DOCUMENTS

| | | | |
|---|---|---|---|
| 6,618,063 B1* | 9/2003 | Kurtenbach | 715/834 |
| 6,727,926 B1* | 4/2004 | Utsuki | G06F 3/0481 |
| | | | 715/810 |
| 6,788,319 B2* | 9/2004 | Matsumoto et al. | 715/841 |
| 6,795,097 B1* | 9/2004 | Yamaguchi et al. | 715/810 |
| 6,938,216 B1* | 8/2005 | Ishisaki | 715/817 |
| 7,272,800 B2* | 9/2007 | Roth et al. | 715/804 |
| 7,490,300 B2* | 2/2009 | Morrill et al. | 715/810 |
| 7,539,950 B2* | 5/2009 | Pankovcin | 715/853 |
| 7,562,309 B2* | 7/2009 | Matthews et al. | 715/827 |
| 7,577,919 B2* | 8/2009 | Hoshino | 715/781 |
| 7,657,843 B2* | 2/2010 | White | 715/810 |
| 7,689,937 B2* | 3/2010 | Pankovcin | 715/853 |
| 7,693,844 B1* | 4/2010 | Bobbitt et al. | 707/999.1 |
| 7,721,228 B2* | 5/2010 | Burke et al. | 715/825 |
| 7,810,048 B2* | 10/2010 | Lee | 715/817 |
| 7,900,160 B2* | 3/2011 | Moody et al. | 715/825 |
| 7,965,275 B1* | 6/2011 | Lew | 345/156 |
| 8,112,718 B2* | 2/2012 | Nezu et al. | 715/810 |
| 8,122,354 B1* | 2/2012 | Torgerson | 715/710 |
| 8,127,229 B2* | 2/2012 | Inoguchi et al. | 715/273 |
| 8,316,320 B2* | 11/2012 | Relyea et al. | 715/817 |
| 8,352,881 B2* | 1/2013 | Champion et al. | 715/834 |
| 8,707,212 B2* | 4/2014 | Ogren | 715/841 |
| 2001/0037223 A1* | 11/2001 | Beery et al. | 705/4 |
| 2002/0154153 A1* | 10/2002 | Messinger et al. | 345/705 |
| 2004/0172347 A1* | 9/2004 | Barthel | 705/31 |
| 2004/0230679 A1* | 11/2004 | Bales et al. | 709/225 |
| 2004/0254950 A1* | 12/2004 | Musgrove et al. | 707/102 |
| 2005/0022198 A1* | 1/2005 | Olapurath | G06Q 10/10 |
| | | | 718/102 |
| 2005/0108661 A1* | 5/2005 | Deeds | 715/865 |
| 2005/0132304 A1* | 6/2005 | Guido et al. | 715/853 |
| 2005/0251747 A1* | 11/2005 | Dolling et al. | 715/713 |
| 2006/0010382 A1* | 1/2006 | Ejiri et al. | 715/712 |
| 2006/0031780 A1* | 2/2006 | Schlotzhauer et al. | 715/805 |
| 2006/0102089 A1* | 5/2006 | Edstrom | A01K 1/031 |
| | | | 119/246 |
| 2006/0107265 A1* | 5/2006 | Schulz | G06Q 10/06 |
| | | | 718/100 |
| 2007/0089047 A1* | 4/2007 | Joshi | 715/501.1 |
| 2008/0184152 A1* | 7/2008 | Kodimer | 715/772 |
| 2009/0019348 A1* | 1/2009 | King | 715/205 |
| 2009/0089709 A1* | 4/2009 | Baier et al. | 715/817 |

* cited by examiner

METHOD, SYSTEM, AND GRAPHICAL USER INTERFACE FOR PRESENTING AN INTERACTIVE HIERARCHY AND INDICATING ENTRY OF INFORMATION THEREIN

BACKGROUND OF THE INVENTION

Businesses commonly offer many health and other welfare benefits to employees. For example, a business may offer medical, dental, or other benefit types. The business may offer several plans (e.g., a separate plan for each medical provider, dental provider, etc.) within each plan type, where each plan has several plan options (e.g., an option for an employee only, an option for an employee and a spouse, an option for an employee and a family, etc.). Accordingly, a large amount of information related to benefit offerings must be managed, especially where the business has many employees.

Computer applications for managing benefit offerings are often used by businesses. Such conventional applications often display many on-screen user interface windows (e.g., one for each plan type, one for each plan, one for each plan option, etc.) for enabling a business to enter and manage the benefit offering information. As such, a user must navigate through many windows to enter setup information, verify that setup information has been entered, etc. Therefore, many avenues for entering incorrect, inconsistent and/or incomplete information exist. Additionally, given that each window is opened separately, conventional applications for managing benefit offerings provide poor sense-of-place as to which level the user is operating on. Further, most conventional applications provide poor sense-of-task for indicating a current operation performed by a user. Accordingly, managing benefit offerings using conventional applications is tedious, inefficient, and time-consuming.

SUMMARY OF THE INVENTION

Accordingly, a need exists for a computer-controlled component for more easily and efficiently managing benefit offerings for employees. A need also exists for such a component which provides better sense-of-place as to which level a user is operating on. Additionally, a need exists for such a component which provides better sense-of-task for indicating a current operation performed by a user. Embodiments of the present invention provide novel solutions to these needs and others as described below.

Embodiments of the present invention are directed to a method, computer system, and graphical user interface for presenting an interactive hierarchy and indicating entry of information therein. More specifically, an interactive hierarchy is used to organize information (e.g., employee benefit offerings) using nodes arranged in multiple levels (e.g., a program level for organizing one or more benefit programs, a plan-type level, a plan level, a plan option level, etc.), where the interactive hierarchy may also be used to select a node to operate on (e.g., enter setup information into, manage existing setup information, etc.). The interactive hierarchy may provide sense-of-place by depicting the organization of the nodes and indicating which node a user is operating on (e.g., by highlighting a node or level). An indicator (e.g., a checkmark or other graphical object) is also provided which indicates whether one or more types of information have been entered for a given node, level of nodes, etc., thereby providing sense-of-task by enabling a user to determine which types of information have already been entered, which types of information have yet to be entered, etc. Further, a task indicator may be provided for stepping users through various information entry and/or management tasks (e.g., related to the interactive hierarchy), thereby further improving sense-of-task.

In one embodiment, a computer-implemented method of presenting an interactive hierarchy and indicating entry of information therein includes displaying the interactive hierarchy in a first region of a graphical user interface, the interactive hierarchy including a plurality of hierarchy levels each with at least one respective node, wherein the at least one respective node is operable to expanded to reveal underlying nodes in response to a user interaction with the first region, and wherein the at least one respective node is operable to collapsed to hide the underlying nodes in response to an additional user interaction with the first region. A plurality of areas are displayed in a second region of the graphical user interface, wherein at least one area of the plurality of areas corresponds to a selected node of the at least one respective node. Additionally, in response to entry of the information associated with the selected node in a third region of the graphical user interface, visual attribute of the at least one area is altered to indicate the entry of the information associated with the selected node. The interactive hierarchy may be related to employee benefits, and wherein the plurality of hierarchy levels include at least one level selected from a group consisting of a benefit program, a benefit plan type within the benefit program, a benefit plan within the benefit plan type, and a benefit option within the benefit plan. Additionally, in one embodiment, the information may be selected from a group consisting of information about a benefit plan, eligibility information for the benefit plan, enrollment information for the benefit plan, and information about dependents enrolled in the benefit plan.

In another embodiment, a graphical user interface for presenting an interactive hierarchy and indicating entry of information therein includes a first region including an interactive hierarchy, the interactive hierarchy including a plurality of hierarchy levels each with at least one respective node, wherein the at least one respective node is operable to expanded to reveal underlying nodes in response to a user interaction with the first region, and wherein the at least one respective node is operable to collapsed to hide the underlying nodes in response to an additional user interaction with the first region. A second region includes a plurality of areas, wherein at least one area of the plurality of areas corresponds to a selected node of the at least one respective node. The graphical user interface may also include a third region for enabling entry of information associated with the selected node, the third region further for displaying an altered visual attribute of the at least one area in response to the entry of the information associated with the selected node. The plurality of areas of the second region may include a first grouping of areas associated with a first category of data and a second grouping of areas associated with a second category of data, wherein the information is associated with the first and second categories of data, wherein the at least one area includes at least one area from the first grouping and further includes at least one area from the second grouping, and wherein the third region is further operable to display a respective graphical object in each area of the at least one area in response to the entry of the information. The interactive hierarchy may be related to employee benefits, and wherein the plurality of hierarchy levels include at least one level selected from a group consisting of a benefit program, a benefit plan type within the benefit program, a benefit plan within the benefit plan type, and a benefit option within the benefit plan. The information may be selected from a group consisting of information about a benefit plan, eligibility information for the benefit plan, enrollment information for the benefit plan, and information about dependents enrolled in the benefit plan.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
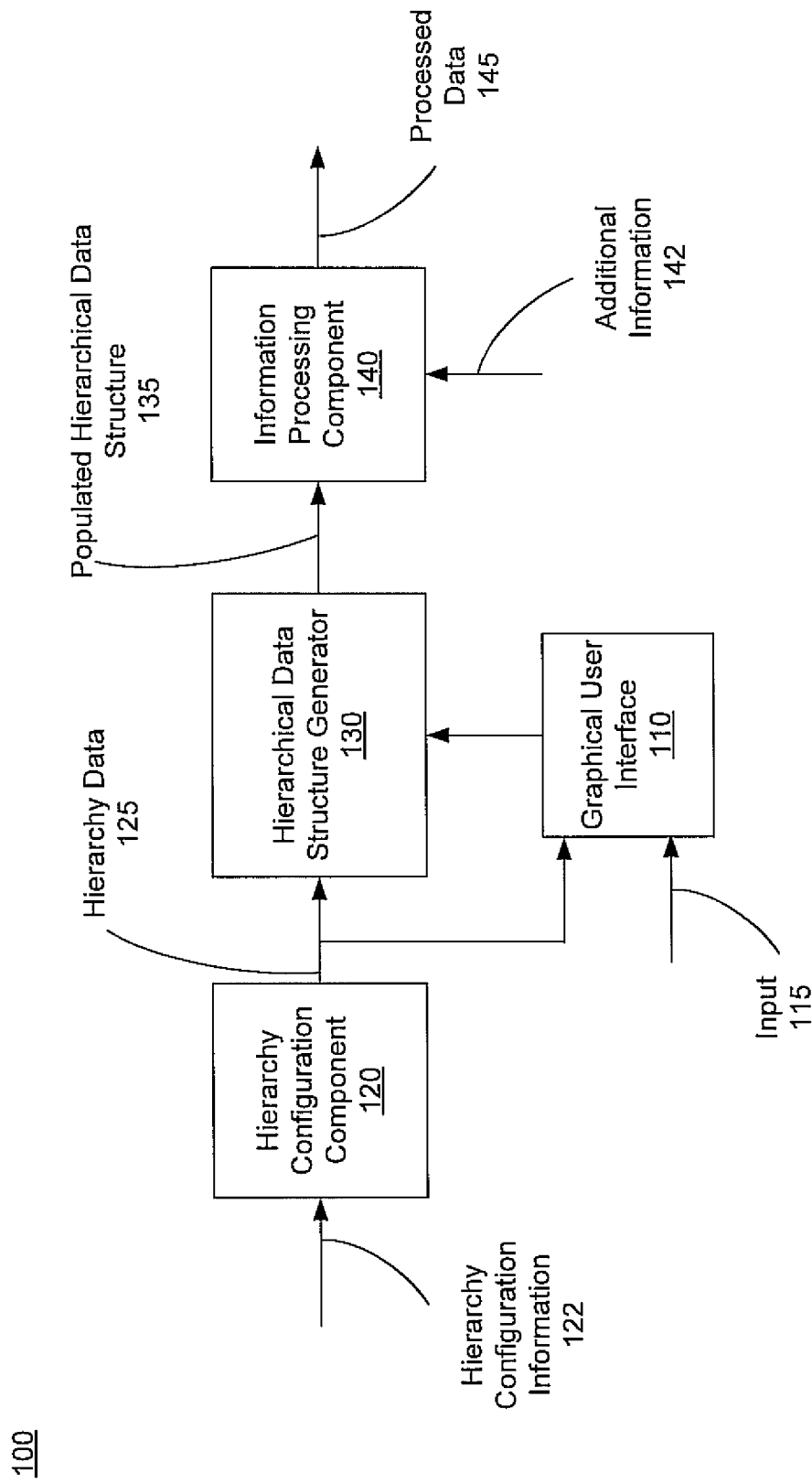
FIG. 1 shows an exemplary data flow diagram depicting generation and processing of a hierarchical data structure in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

NOTATION AND NOMENCLATURE

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "adding," "adjusting," "altering," "analyzing," "applying," "assembling," "assigning" "balancing," "blocking," "calculating," "capturing," "combining," "comparing," "collecting," "creating," "debugging," "defining," "depicting," "detecting," "determining," "displaying," "enabling," "establishing," "executing," "flipping," "generating," "grouping," "hiding," "identifying," "initiating," "interacting," "modifying," "monitoring," "moving," "outputting," "performing," "placing," "presenting," "processing," "programming," "querying," "removing," "repeating," "resuming," "sampling," "simulating," "sorting," "storing," "subtracting," "suspending," "tracking," "transcoding," "transforming," "unblocking," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

EMBODIMENTS OF THE INVENTION

FIG. 1 shows exemplary data flow diagram 100 depicting generation and processing of a hierarchical data structure in accordance with one embodiment of the present invention. As shown in FIG. 1, graphical user interface (GUI) 110 is operable to present an interactive hierarchy (e.g., depicted in FIG. 3 below) and for receiving information (e.g., input 115) for populating the hierarchy or hierarchical data structure based thereon. Input 115 may include user input or interactions with GUI 110 (e.g., soft button presses via clicking of a mouse button, text input via a keyboard, etc.), or alternatively, may include automated input via a system, device, etc. Once the information (e.g., 115 for populating the interactive hierarchy displayed using GUI 110) is entered, GUI 110 may visually depict (e.g., using on-screen shading, on-screen graphical objects, etc.) or otherwise signal the entry of the information (e.g., as discussed below with respect to FIGS. 3 through 7).

As shown in FIG. 1, hierarchy data 125 may be used to generate the interactive hierarchy presented using GUI 110. Hierarchy data 125 may be generated by hierarchy configuration component 120 based upon hierarchy configuration information 122 in one embodiment. Additionally, hierarchy data 125 may be accessed by hierarchy data structure generator 130 along with information captured by GUI 110 and used to populate a data structure corresponding to the interactive hierarchy (e.g., presented by GUI 110). Accordingly, in this manner, hierarchy data 125 may provide the "framework" (e.g., number of nodes, organization of nodes, etc.) for the hierarchy, while data accessed from GUI 110 may be used to populate the hierarchy or otherwise build on the framework established by hierarchy data 125.

In one embodiment, the interactive hierarchy presented using GUI 110 may be related to employee benefits. For example, the highest level of the hierarchy may include at least one benefit program (e.g., flex benefits, non-flex benefits, etc.), a next-lowest level may include benefit plan types (e.g., medical, dental, etc.) within each benefit program, a next-lowest level may include benefit plans (e.g., a respective medical plan for each insurance provider, etc.) within each benefit plan type, and a next-lowest level may include benefit options (e.g., a plan option for an employee only, a plan option for an employee plus a spouse, a plan option for an employee plus a family, etc.). In this manner, hierarchy data 125 may relate to employee benefit offerings. Additionally, the information used to populate the hierarchy (e.g., accessed via GUI 110) may include information about a benefit plan, eligibility information for said benefit plan, enrollment information for said benefit plan, information about dependents enrolled in said benefit plan, etc.

In this manner, GUI 110 may provide easy and convenient entry and/or management of information related to employee benefit offerings, where GUI 110 may be used to provide sense-of-place (e.g., by depicting the organization of the hierarchy nodes and indicating which node a user is operating on) and/or sense-of-task (e.g., by indicating entry of certain types of information and/or by providing a task indicator for stepping users through various information entry and/or management tasks). Visual attributes of areas of the GUI corresponding to nodes of the hierarchy may be altered (e.g., by changing the color of the areas, by displaying graphical objects in the areas, etc.), thereby enabling a user to easily and quickly see if information has been entered for a specific node, a level of nodes, etc. Where the areas are grouped by information type, the GUI (e.g., 110) may enable users to easily and quickly see which type of information has been entered for a specific node, level of nodes, etc. Further, the GUI (e.g., 110) may display information entry pages (e.g., corresponding to a node, level of nodes, etc.) in a region of the GUI separate from the interactive hierarchy, thereby enabling users to easily and quickly select a desired hierarchy object (e.g., a node, level of nodes, etc.) and perform management operations (e.g., adding information, deleting information, editing information, etc.) using the information entry page corresponding to the selected hierarchy object.

As shown in FIG. 1, generator 130 may output populated hierarchical data structure 135 for access by one or more other components. For example, information processing component 140 may process populated hierarchical data structure 135 in accordance with additional information 142 to generate processed data 145. In one embodiment, where populated hierarchical data structure 135 is related to employee benefit offerings, additional information 142 may include employee-specific information (e.g., employee name, employee start date, information about employee's spouse and/or family for which benefits are sought, etc.). In this manner, component 140 may compare the information about employee benefit offerings (e.g., 135) with the employee-specific information (e.g., 142) to generate information about which benefits each employee is entitled to (e.g., 145). In other embodiments, component 140 may generate other processed data (e.g., 145) based upon the same and/or different information.

In another embodiment, component 140 may evaluate the information in populated hierarchical data structure 135 and generate an updated data structure 135. For example, where data structure 135 includes data for a parent node as well as data for at least one child node of the parent node, then component 140 may ignore data entered for the parent node where there is information entered for the child node. In this manner, component 140 may enable the information entered for the child node to trump information entered at the parent node level. Alternatively, in one embodiment, component 140 may associate information entered for the parent node with a child node for which no information has been entered.

And in yet another embodiment, an updated hierarchical data structure may be generated by component 140 by applying information associated with the parent node to child nodes for which related information has not yet been entered. For example, if enrollment information (e.g., minimum period of time after the employee's start date before the employee becomes eligible for benefits) is entered for the parent node (e.g., at a hierarchy level associated with a plan such as a medical or dental plan), then this enrollment information may be associated with one or more child nodes (e.g., at a hierarchy level associated with a plan option such as employee only, employee plus spouse, employee plus family, etc.) which have no such enrollment information associated therewith even though the one or more child nodes may have other information (e.g., other enrollment information, non-enrollment information, etc.) associated therewith.

Figure 2:
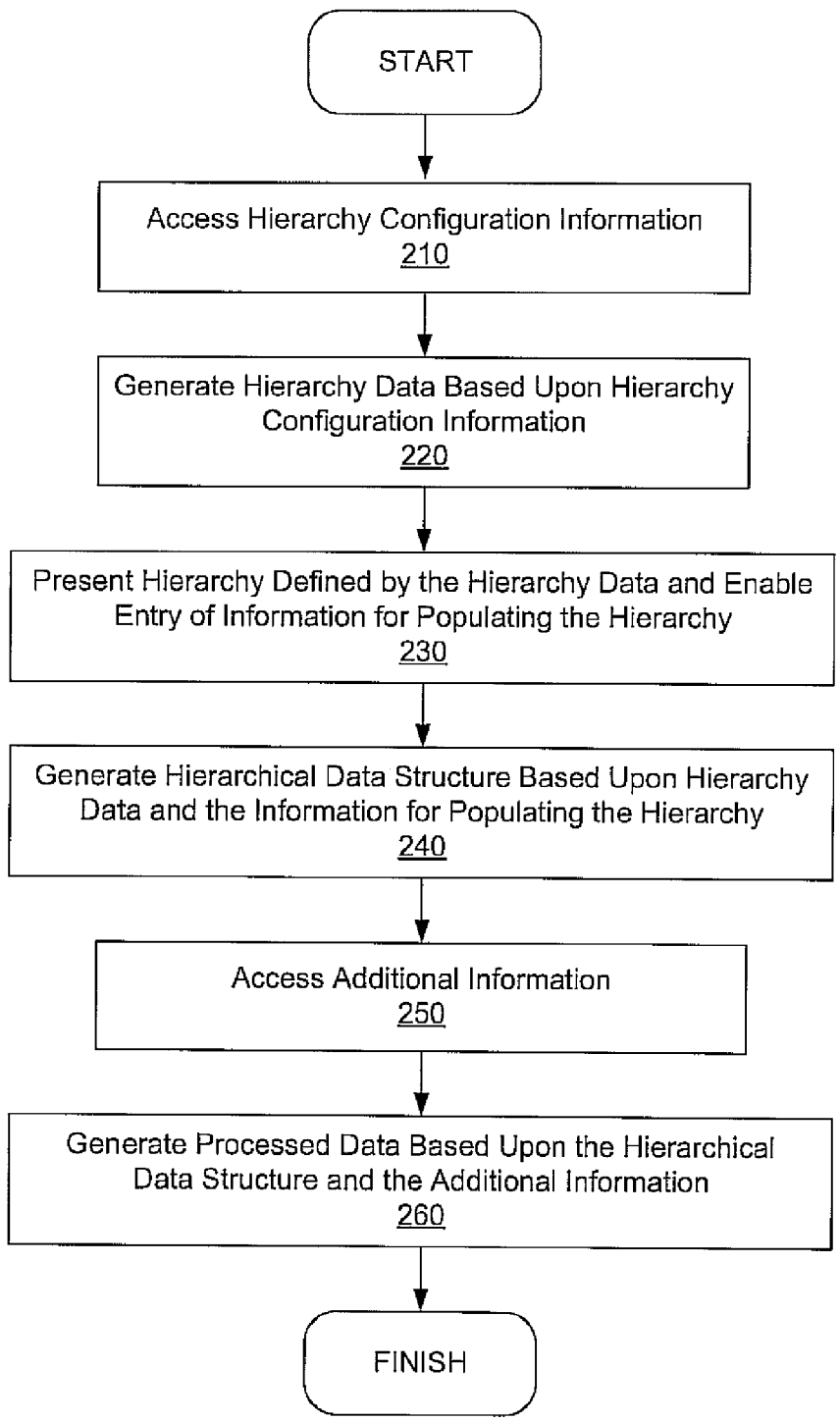
FIG. 2 shows a flowchart of an exemplary computer-implemented process for generating and processing a hierarchical data structure in accordance with one embodiment of the present invention.

FIG. 2 shows a flowchart of exemplary computer-implemented process 200 for generating and processing a hierarchical data structure in accordance with one embodiment of the present invention. As shown in FIG. 2, step 210 involves accessing hierarchy configuration information. The hierarchy configuration information (e.g., 122) may be accessed by a hierarchy configuration component (e.g., 120) in one embodiment.

Step 220 involves generating hierarchy data based upon hierarchy configuration information. The hierarchy data (e.g., 125) may be generated by a hierarchy configuration component (e.g., 120) in one embodiment. Additionally, the hierarchy data (e.g., 125) may relate to employee benefit offerings in one embodiment. For example, the highest level of the hierarchy may include at least one benefit program (e.g., flex benefits, non-flex benefits, etc.), a next-lowest level may include benefit plan types (e.g., medical, dental, etc.) within each benefit program, a next-lowest level may include benefit plans (e.g., a respective medical plan for each insurance provider, etc.) within each benefit plan type, and a next-lowest level may include benefit options (e.g., a plan option for an employee only, a plan option for an employee plus a spouse, a plan option for an employee plus a family, etc.).

As shown in FIG. 2, step 230 involves presenting a hierarchy defined by the hierarchy data and enabling entry of information for populating the hierarchy. The hierarchy may be presented as part of a GUI (e.g., 110) in one embodiment. Additionally, the hierarchy may include an interactive hierarchy with nodes which may be expanded to reveal underlying child nodes and/or collapsed to hide underlying nodes (e.g., in response to user interaction with the nodes). The information for populating the nodes may be entered into a separate region of the GUI (e.g., 110) which is displayed simultaneously with the interactive hierarchy, thereby providing sense-of-place and sense-of-task (e.g., as described herein).

Step 240 involves generating a hierarchical data structure based upon the hierarchy data and the information for populating the hierarchy. The hierarchical data structure (e.g., 125) may be generated by a hierarchical data structure generator (e.g., 130) which accesses the information for populating the hierarchy from a GUI (e.g., 110) operable to receive this information. In this manner, the hierarchy data (e.g., 125) may provide the "framework" for the data structure, while the information for populating the hierarchy (e.g., accessed from the GUI) may be used to populate or otherwise build on the framework.

As shown in FIG. 2, step 250 involves accessing additional information. The additional information (e.g., 142) may be accessed by an information processing component (e.g., 140) in one embodiment. Additionally, the additional information (e.g., 142) may include employee-specific information (e.g., employee name, employee start date, information about employee's spouse and/or family for which benefits are sought, etc.) in one embodiment.

Step 260 involves generating processed data based upon the hierarchical data structure and the additional information. The processed data (e.g., 145) may be generated by an information processing component (e.g., 140) in one embodiment. Additionally, the generation of the processed data (e.g., 145) in step 260 may include comparing information about employee benefit offerings (e.g., populated hierarchical data structure 135 generated in step 240) with employee-specific information (e.g., additional information 142 accessed in step 250) to generate information about which benefits each employee is entitled to (e.g., 145) in one embodiment. Alternatively, the generation of processed data (e.g., 145) in step 260 may include evaluating or otherwise processing the populated hierarchical data structure (e.g., 135) to generate an updated hierarchical data structure (e.g., as discussed with respect to FIG. 1 above).

Figure 3:
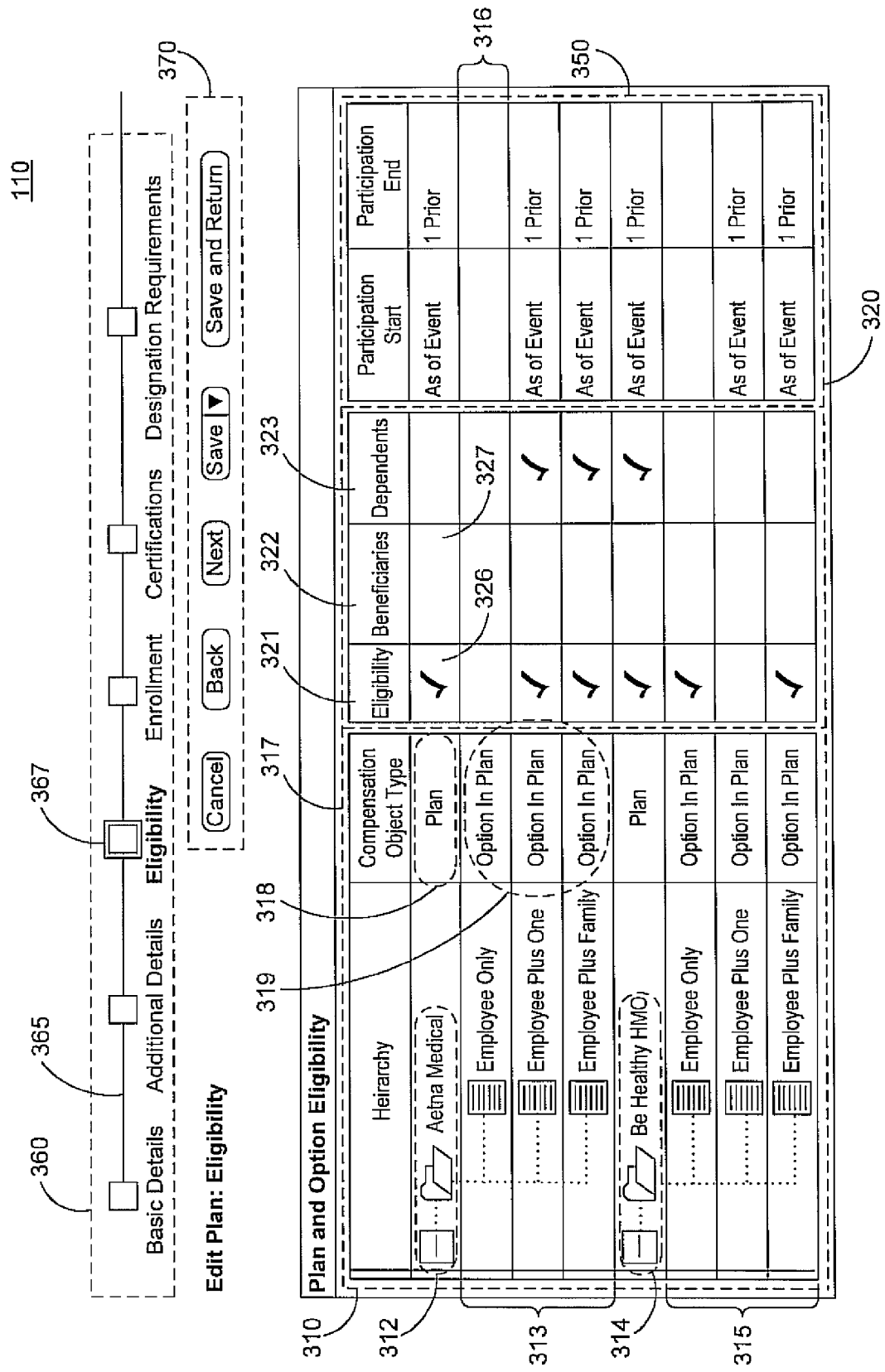
FIG. 3 shows an exemplary on-screen graphical user interface for presenting an interactive hierarchy and indicating entry of information therein in accordance with one embodiment of the present invention.
Figure 3:
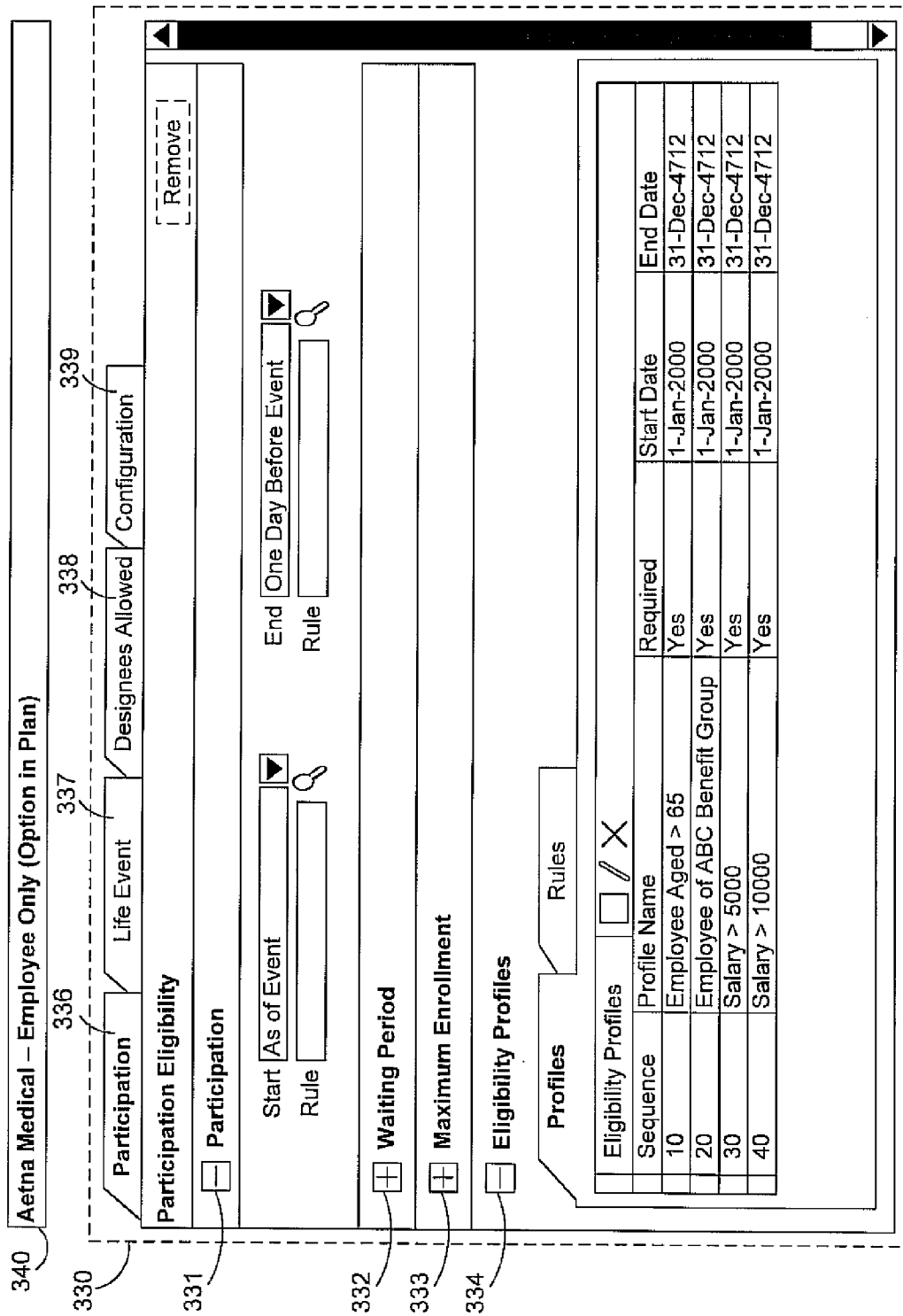

FIG. 3 shows exemplary on-screen graphical user interface (GUI) 110 for presenting an interactive hierarchy and indicating entry of information therein in accordance with one embodiment of the present invention. As shown in FIG. 3, GUI 110 includes interactive hierarchy 310 with a plurality of expandable and collapsible nodes, each assigned to a respective hierarchy level which may be shared by one or more other nodes. For example, interactive hierarchy 310 includes parent nodes 312 and 314 at a top hierarchy level. Additionally, interactive hierarchy 310 includes child nodes 313 of parent node 312. Further, interactive hierarchy 310 includes child nodes 315 of parent node 314. In one embodiment, the organization of nodes within interactive hierarchy 310 may be defined by hierarchy configuration information (e.g., 122) and/or hierarchy data (e.g., 125).

As shown in FIG. 3, node identifiers 317 may provide information about a node and/or indicate which hierarchy level of interactive hierarchy 310 that the respective node belongs. For example, node identifier 318 indicates that node 312 is at the "plan" level, and in one embodiment, may include a node associated with a benefit plan (e.g., as opposed to a program, plan type, plan option, etc.). In contrast, node identifier 319 indicates that nodes 313 are at the "option in plan" or plan option level, and in one embodiment, may include a node associated with a plan option (e.g., as opposed to a program, plan type, plan, etc.). In this manner, a node identified as a plan option (e.g., nodes 313, nodes 315, etc.) may include a child node of a node identified as a plan (e.g., node 312, node 314, etc.).

A parent node of interactive hierarchy 310 may be expanded (e.g., by the user) to reveal child nodes and/or collapsed to hide the child nodes in response to user interaction (e.g., moving a mouse cursor over the parent node and clicking a mouse button, pressing a keyboard key, etc.) with the parent node. For example, a user may reveal child nodes 313 in response to interaction with parent node 312 (e.g., as depicted in FIG. 3). Child nodes 313 may be subsequently hidden by further interaction with parent node 312. It should also be appreciated that one or more objects corresponding to a child node (e.g., a node identifier 317, an indicator or area 320, an information object 350, etc.) presented by GUI 110 may be hidden while the child node is hidden. Similarly, the one or more objects corresponding to the child node may be revealed or displayed while the child node is revealed or displayed (e.g., as depicted in FIG. 3).

As shown in FIG. 3, selection of a node from interactive hierarchy 310 may enable entry of information in region 330 of GUI 110 for the selected node. For example, if the top node of nodes 313 is selected, then information for that selected node may be entered in region 330. Alternatively, if node 312 is selected, then information for node 312 may be entered. As discussed above, the information entered for parent nodes (e.g., node 312) may be applied to one or more child nodes (e.g., during an evaluation stage subsequent to the entry stage) in one embodiment. Additionally, the selected node (e.g., for which information is entered using region 330) may be identified by alteration of a portion of the GUI corresponding to the selected node (e.g., using highlighted bar 316 to indicate that the top node of nodes 313 is selected and currently associated with region 330) and/or by display of information associated with the selected node (e.g., as indicated by header 340 which identifies the top node of nodes 313). Thus, interactive hierarchy 310 may provide sense-of-place and/or sense-of-task by enabling a user to determine which node or hierarchy level information the entered information pertains to and also by enabling a user to determine how the selected node relates to other nodes of the hierarchy.

Region 330 may include various mechanisms (e.g., text-entry fields, pull-down menus with selectable items, radio buttons, etc.) for entering information. Additionally, nodes 331-334 may be expanded and/or collapsed (e.g., by the user) to reveal one or more of these entry mechanisms, thereby categorizing the information entered and enabling easier access to the information. Further, the nodes (e.g., 331-334) may form a hierarchy (e.g., nodes 332 and 333 may include child nodes of parent node 331) in one embodiment. Region 330 may also include tabs 336-339 for enabling additional information to be entered into GUI 110 and further organizing the information entered.

As shown in FIG. 3, indicators or areas 320 may indicate (e.g., that one or more types of information has been entered into GUI 110 (e.g., region 330). For example, column 321 may be associated with eligibility information, column 322 may be associated with information about beneficiaries, and column 323 may be associated with dependents. Further, each row of columns 321-323 may correspond to a node of interactive hierarchy 310. Thus, buy altering a visual attribute of an indicator 320 (e.g., by changing the color of the area, by displaying a graphical object in the area, etc.), GUI 110 may indicate that information (e.g., of a type corresponding to the respective column of the altered indicator) has already been entered for a node corresponding to the altered indicator. For example, the display of a graphical object (e.g., a checkmark) in indicator or area 326 may indicate that eligibility information has been entered (e.g., in region 330) for node 312, while the lack of a graphical object displayed in indicator or area 327 may indicate that information about beneficiaries has not yet been entered (e.g., in region 330) for node 312. As such, a user may be able to quickly determine which types of information are yet to be entered for various nodes using indicators 320, thereby improving sense-of-task over conventional solutions.

Additionally, information entered into GUI 110 (e.g., into region 330) may include more than one type of information in one embodiment. For example, a rule concerning eligibility of the employee may also pertain to dependents of the employee, and thus, the rule may include eligibility information and information about dependents. Accordingly, entry of information may cause the alteration of a visual attribute associated with more than one of areas or indicators 320. For example, entry of a rule which includes eligibility information and information about dependents may trigger alteration (e.g., a change in color, display of a graphical object, etc.) of at least one indicator from column 321 (e.g., for indicating entry of information associated with eligibility) and at least one indicator from column 323 (e.g., for indicating entry of information associated with dependents).

As shown in FIG. 3, region 350 may display certain portions of information entered into region 330 for each corresponding node of interactive hierarchy 310. For example, the left-most column may show a participation start date, while the right-most column may show a participation end date. It should be appreciated that region 350 may be configured to display additional and/or different information in other embodiments. Accordingly, embodiments enable a user to quickly and easily view information corresponding to nodes of hierarchy 310 (e.g., without navigating through hierarchy 310 and/or without navigating through information presented in region 330).

Region 360 of GUI 110 includes task indicator 365 for stepping users through various information entry and/or management tasks. For example, graphical object 367 may indicate that GUI 110 is currently placed in a stage associated with the management and/or entry of eligibility information. Graphical object 367 may move horizontally along task indicator 365 to indicate management or entry of other information (e.g., basic details about benefit offerings, further information about benefit offerings, enrollment information, certifications, designation requirements, etc.). Thus, embodiments improve sense-of-task by using task indicator 365 to indicate a current task of GUI 110.

As shown in FIG. 3, GUI 110 also includes various interactive buttons or graphical objects 370. Interaction with graphical objects 370 may execute operations such as moving to the next task (e.g., indicated by task indicator 365), moving to the previous task (e.g., indicated by task indicator 365), cancelling an operation performed using GUI 110, saving information entered in GUI 110 (e.g., for subsequent access by generator 130, for initiating generation of populated hierarchical data structure 135, for initiating further processing by component 140, etc.), etc.

Although FIG. 3 shows interactive hierarchy with a specific number of nodes organized into two hierarchy levels, it should be appreciated that interactive hierarchy may include a different number of nodes and/or a different organization of nodes (e.g., with a different number of nodes at one or more hierarchy levels, a larger number of hierarchy levels, etc.) in other embodiments. Additionally, it should be appreciated that GUI 110 may include a different organization (e.g., different number of regions and/or features, different organization of regions and/or features, etc.) in other embodiments. Further, it should be appreciated that indicators 320 may be alternatively organized (e.g., into a larger or smaller number of information types, etc.) in other embodiments.

Figure 4:
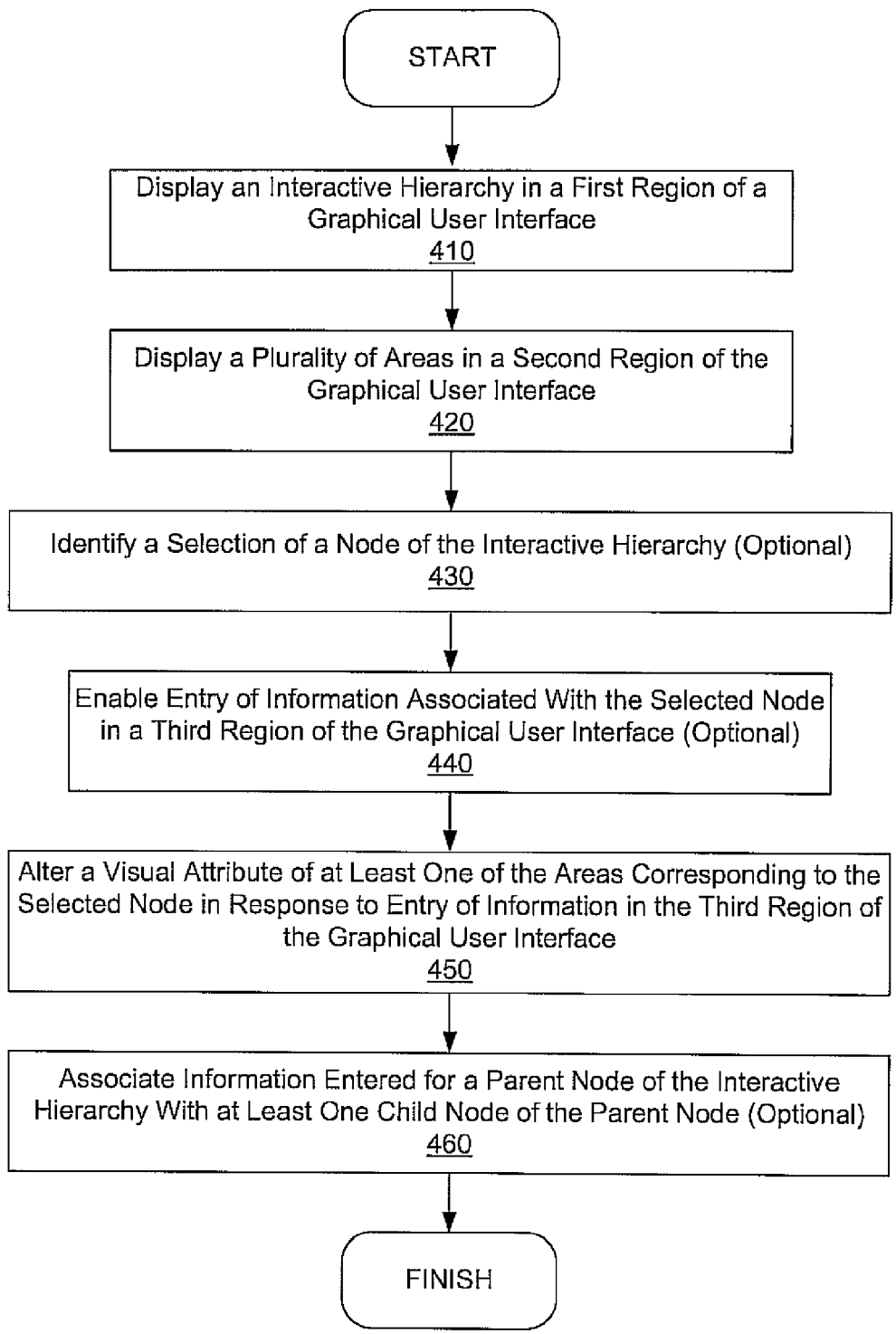
FIG. 4 shows a flowchart of an exemplary computer-implemented process for presenting an interactive hierarchy and indicating entry of information therein in accordance with one embodiment of the present invention.

FIG. 4 shows a flowchart of exemplary computer-implemented process 400 for presenting an interactive hierarchy and indicating entry of information therein in accordance with one embodiment of the present invention. As shown in FIG. 4, step 410 involves displaying an interactive hierarchy (e.g., 310) in a first region of a graphical user interface (e.g., 110). The interactive hierarchy (e.g., 310) may include a plurality of nodes (e.g., 312, 314, etc.) which may be expanded to reveal underlying child nodes (e.g., 313, 315, etc.) and/or collapsed to hide the underlying child nodes (e.g., 313, 315, etc.). Additionally, the interactive hierarchy may be related to employee benefits, and the hierarchy levels of the interactive hierarchy may be related to a benefit program, a benefit plan type within said benefit program, a benefit plan within said benefit plan type, a benefit option within said benefit plan, etc.

Step 420 involves displaying a plurality of areas (e.g., indicators 320) in a second region of the graphical user interface (e.g., 110). The second region may be separate from the first region displaying the interactive hierarchy (e.g., 310), and in one embodiment, the plurality of areas of the second region may be displayed simultaneously with the interactive hierarchy in the first region (e.g., step 420 may be performed simultaneously with step 410). Additionally, at least one area may correspond to each node of the interactive hierarchy (e.g., 310) in one embodiment. Further, the plurality of areas may be categorized into groupings, where each grouping corresponds to a different type or category of information.

As shown in FIG. 4, optional step 430 involves identifying a selection of a node of the interactive hierarchy. The node may be selected by interaction with a graphical object of the displayed interactive hierarchy which corresponds to the selected node in one embodiment. In other embodiments, the selection may be made through text entry, selecting a menu item corresponding to the node, etc.

Optional step 440 involves enabling entry of information associated with the selected node in a third region of the graphical user interface (e.g., 110). The information entered may include information about a benefit plan, eligibility information for said benefit plan, enrollment information for said benefit plan, information about dependents enrolled in said benefit plan, etc. The selected node may include a node selected in step 430 in one embodiment. Additionally, the third region of the GUI (e.g., region 330) may be separate from the first region (e.g., including the interactive hierarchy) and/or second region (e.g., including the plurality of areas or indicators). Further, the third region may be displayed simultaneously with the first and/or second regions of the GUI in one embodiment.

Step 450 involves altering a visual attribute of at least one of the areas corresponding to the selected node in response to entry of information in the third region of the graphical user interface. The altering may include changing the color of the at least one area, displaying a graphical object in the at least one area, etc. Additionally, where the selected node is associated with multiple areas or indicators (e.g., 320), and where the information entered is also associated with the multiple areas or indicators (e.g., a rule including enrollment information and information about dependents), then step 450 may involve altering a visual attribute of the multiple areas.

As shown in FIG. 4, optional step 460 involves associating information entered for a parent node (e.g., 312, 314, etc.) of the interactive hierarchy with at least one child node (e.g., 313, 315, etc.) of the parent node. In one embodiment, step 460 may be performed when no information has been entered for the child node. Alternatively, when information has been entered for the child node, step 460 may be performed when this information is not related to the information entered for the parent node. For example, if enrollment information (e.g., minimum period of time after the employee's start date before the employee becomes eligible for benefits) is entered for the parent node (e.g., at a hierarchy level associated with a plan such as a medical or dental plan), then this enrollment information may be associated with one or more child nodes (e.g., at a hierarchy level associated with a plan option such as employee only, employee plus spouse, employee plus family, etc.) which have no such enrollment information associated therewith even though the one or more child nodes may have other information (e.g., other enrollment information, non-enrollment information, etc.) associated therewith.

Figure 5:
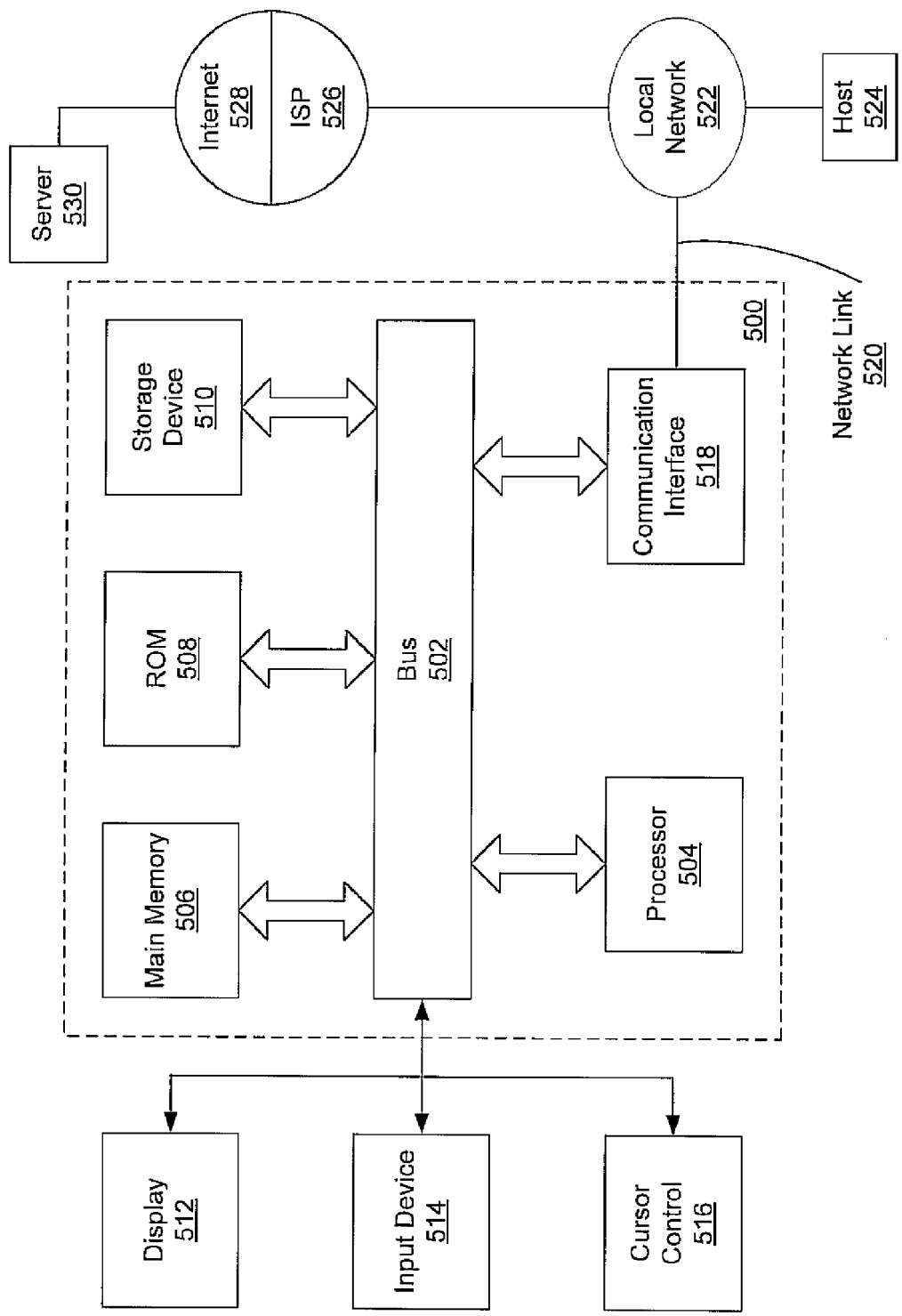
FIG. 5 shows an exemplary computer system upon which embodiments of the present invention may be implemented.

FIG. 5 shows exemplary computer system 500 upon which embodiments of the present invention may be implemented. With reference to FIG. 5, portions of the present invention are comprised of computer-readable and computer-executable instructions that reside, for example, in computer system 500 which may be used as a part of a general purpose computer network (not shown). It is appreciated that computer system 500 of FIG. 5 is merely exemplary. As such, the present invention can operate within a number of different computer systems including general-purpose computer systems, embedded computer systems, laptop computer systems, hand-held computer systems, and stand-alone computer systems.

In the present embodiment, computer system 500 includes an address/data bus 502 for conveying digital information between the various components, a central processor unit (CPU) 504 coupled to bus 502 for processing the digital information and instructions, a volatile main memory 506 coupled to bus 502 comprised of volatile random access memory (RAM) for storing the digital information and instructions, and a non-volatile read only memory (ROM) 508 coupled to bus 502 for storing information and instructions of a more permanent nature. In addition, computer system 500 may also include a data storage device 510 (e.g., a magnetic, optical, floppy, tape drive, etc.) coupled to bus 502 for storing larger amounts of data. Data (e.g., comprising instructions, commands, etc.) for performing a process (e.g., 900, 1000, 1100, etc.) for presenting an interactive hierarchy (e.g., 310) and indicating entry of information therein may be stored in main memory 506, ROM 508, storage device 510, registers within processor 504 (not shown), in an external storage device (not shown), or some combination thereof.

As shown in FIG. 5, computer system 500 may be coupled via bus 502 to an optional display device 512 (e.g., a CRT monitor, LCD monitor, etc.) for displaying information received from computer system 500. An optional input device 514 (e.g., an alphanumeric keyboard) may also be coupled to computer system 500 via bus 502 for communicating information and command selections to processor 504. Cursor control device 516 (e.g., a mouse, trackball, light pen, etc.) may also be coupled to computer system 500 via bus 502 for communicating direction information and command selections to processor 504 and for controlling cursor movement (e.g., on display 512). Additionally, computer system 500 can include a mechanism for emitting an audible signal (not shown).

Computer system 500 may also include a communication interface 518 coupled to bus 502. Communication interface 518 provides a two-way data communication coupling to local network 522 via network link 520. For example, communication interface 518 may be an integrated services digital network (ISDN) device or a modem to provide a data communication connection to a corresponding type of telephone line. As another example, communication interface 518 may be a local area network (LAN) device to provide a data communication connection to a compatible LAN. And as yet another example, network link 520 may comprise a wireless connection between communication interface 518 and local network 522. Regardless of the implementation utilized, communication interface 518 may send and receive electrical, electromagnetic, and/or optical signals that carry digital data streams representing various types of information.

As shown in FIG. 5, network link 520 may provide data communication through one or more networks to other data devices. For example, network link 520 may provide a connection through local network 522 to a host computer 524 or to data equipment operated by internet service provider (ISP) 526. ISP 526 in turn provides data communication services through the worldwide packet data communication network, now commonly referred to as the "internet" 528. Local network 522 and internet 528 may use electrical, electromagnetic, and/or optical signals to convey digital data streams. The signals through the various networks and network link 520, which carry digital data to and from computer system 500, are exemplary forms of carrier waves transporting information.

Accordingly, computer system 500 can send and receive messages through network(s), network link 520, and communication interface 518. For example, server 530 might transmit a requested code for an application program through internet 528, ISP 526, local network 522, and communication interface 518. The received code may be executed by processor 504 upon receipt, and/or be stored in one of the coupled memory devices (e.g., storage device 510, ROM 508, RAM 506, etc.) for later execution.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A computer-implemented method of presenting an interactive hierarchy and indicating entry of information therein, said method comprising:

presenting said interactive hierarchy in a first area of a first region of a graphical user interface, said interactive hierarchy comprising a plurality of hierarchy levels each with at least one respective node, wherein said at least one respective node is operable to expand to reveal underlying nodes in response to a user interaction with said first region, and wherein said at least one respective node is operable to collapse to hide said underlying nodes in response to a user interaction with said first region, and wherein each of the at least one respective node and underlying nodes has a type name that indicates a hierarchy level of the plurality of hierarchy levels for the at least one respective node and underlying nodes that is presented in the first area of the first region;

presenting, in a second area of the first region, a plurality of graphical elements, each graphical element from the plurality of graphical elements corresponding to and visually associated with a node from the at least one respective node and the underlying nodes presented in the interactive hierarchy, each graphical element from the plurality of graphical elements indicating an entry of information associated with the visually associated node from the at least one respective node and the underlying nodes;

receiving an indication of a selected node of said at least one respective node;

altering a visual attribute for the selected node in the first region of the graphical user interface to indicate that the selected node is selected;

in response to receiving an indication of the selected node, presenting a plurality of areas in a second region of said graphical user interface, wherein at least one area of said plurality of areas corresponds to the selected node of said at least one respective node and presents the type name of the selected node, the second region comprising a plurality of graphical elements representing a plurality of hierarchical nodes, each hierarchical node of the second region comprising a child node of the selected node of said at least one respective node, wherein each graphical element of the second region is selectable to expand and collapse the represented hierarchical node, and wherein the at least one area corresponding to the selected node comprises input elements for the entry of information associated with the selected node;

presenting a third region of said graphical user interface, said third region comprising a task indicator including a linear sequence of a plurality of graphical elements, each graphical element corresponding to an information entry or management task of a plurality of information entry or management tasks, the graphical elements of the task indicator representing a sequence of steps to complete the information entry or management tasks, and the third region further comprising a graphical object indicating one of the graphical elements of the task indicator corresponding to a current task of the plurality of information entry or management tasks, wherein the entry of information associated with the selected node is a task of the plurality of information entry or management tasks;

in response to selection of the selected node, altering the graphical object indicating one of the graphical elements of the task indicator to correspond to the entry of information associated with the selected node;

in response to the entry of said information associated with said selected node, presenting, in a third area of the first region, at least a portion of the information entered wherein the at least the portion of the information entered is visually associated with the selected node in the first region; and in response to the entry of said information associated with said selected node, altering a graphical element in the second area of the first region to indicate the entry of information associated with the selected node.

2. The computer-implemented method of claim 1, wherein said presenting a plurality of areas in the second region comprises:

presenting a first tab comprising a grouping of the plurality of graphical elements representing the plurality of hierarchical nodes associated with a first category of data; and presenting a second tab comprising a grouping of the plurality of graphical elements representing the plurality of hierarchical nodes associated with a second category of data, wherein said at least one area comprises at least one area from said first grouping and further comprises at least one area from said second grouping, and wherein said altering a visual attribute of said at least one area comprises presenting a respective graphical object in each area of the at least one area to indicate said entry of said information.

3. The computer-implemented method of claim 2, wherein each of the plurality of graphical elements representing the plurality of hierarchical nodes associated with the first category of data in the first tab is operable to expand to display data underlying the represented hierarchical node.

4. The computer-implemented method of claim 1, wherein said interactive hierarchy is related to managing employee benefit information, and wherein said plurality of hierarchy levels comprise at least one level selected from a group consisting of a benefit program, a benefit plan type within said benefit program, a benefit plan within said benefit plan type, and a benefit option within said benefit plan.

5. The computer-implemented method of claim 1, wherein said information is selected from a group consisting of information about a benefit plan, eligibility information for said benefit plan, enrollment information for said benefit plan, and information about dependents enrolled in said benefit plan.

6. The computer-implemented method of claim 1, wherein said interactive hierarchy comprises a higher hierarchy level and a lower hierarchy level, wherein said higher hierarchy level comprises a parent node and said lower hierarchy level comprises at least one child node of said parent node, and further comprising:

in response to entry of additional information associated with said parent node in a fourth region of said graphical user interface, automatically associating said additional information with each of said at least one child node.

7. The computer-implemented method of claim 1 further comprising:

generating a hierarchical data structure based upon data entered into said graphical user interface, wherein said hierarchical data structure comprises said information associated with said selected node; and processing additional information in accordance with said hierarchical data structure to generate processed data.

8. A computer system comprising a processor coupled to a bus and a memory coupled to said bus, wherein said memory comprises instructions that when executed on said processor implement a method of presenting an interactive hierarchy and indicating entry of information therein, said method comprising:

presenting said interactive hierarchy in a first area of a first region of a graphical user interface, said interactive hierarchy comprising a plurality of hierarchy levels each with at least one respective node, wherein said at least one respective node is operable to expand to reveal underlying nodes in response to a user interaction with said first region, and wherein said at least one respective node is operable to collapse to hide said underlying nodes in response to a user interaction with said first region, and wherein each of the at least one respective node and underlying nodes has a type name that indicates a hierarchy level of the plurality of hierarchy levels for the at least one respective node and underlying nodes that is presented in the first area of the first region;

presenting, in a second area of the first region, a plurality of graphical elements, each graphical element from the plurality of graphical elements corresponding to and visually associated with a node from the at least one respective node and the underlying nodes presented in the interactive hierarchy, each graphical element from the plurality of graphical elements indicating an entry of information associated with the visually associated node from the at least one respective node and the underlying nodes;

receiving an indication of a selected node of said at least one respective node;

altering a visual attribute for the selected node in the first region of the graphical user interface to indicate that the selected node is selected;

in response to receiving an indication of the selected node, presenting a plurality of areas in a second region of said graphical user interface, wherein at least one area of said plurality of areas corresponds to the selected node of said at least one respective node and presents the type name of the selected node, the second region comprising a plurality of graphical elements representing a plurality of hierarchical nodes, each hierarchical node of the second region comprising a child node of the selected node of said at least one respective node, wherein each graphical element of the second region is selectable to expand and collapse the represented hierarchical node, and wherein the at least one area corresponding to the selected node comprises input elements for the entry of information associated with the selected node;

presenting a third region of said graphical user interface, said third region comprising a task indicator including a linear sequence of a plurality of graphical elements, each graphical element corresponding to an information entry or management task of a plurality of information entry or management tasks, the graphical elements of the task indicator representing a sequence of steps to complete the information entry or management tasks, and the third region further comprising a graphical object indicating one of the graphical elements of the task indicator corresponding to a current task of the plurality of information entry or management tasks, wherein the entry of information associated with the selected node is a task of the plurality of information entry or management tasks;

in response to selection of the selected node, altering the graphical object indicating one of the graphical elements of the task indicator to correspond to the entry of information associated with the selected node;

in response to the entry of the information associated with the selected node, presenting, in a third area of the first region, at least a portion of the information entered wherein the at least the portion of the information entered is visually associated with the selected node in the first region; and in response to the entry of said information associated with said selected node, altering a graphical element in the second area of the first region to indicate the entry of information associated with the selected node.

9. The computer system of claim 8, wherein said presenting a plurality of areas comprises:

presenting a first tab comprising a grouping of the plurality of graphical elements representing the plurality of hierarchical nodes associated with a first category of data; and presenting a second tab comprising a grouping of the plurality of graphical elements representing the plurality of hierarchical nodes associated with a second category of data, wherein said at least one area comprises at least one area from said first grouping and further comprises at least one area from said second grouping, and wherein said altering a visual attribute of said at least one area comprises presenting a respective graphical object in each area of the at least one area to indicate said entry of said information.

10. The computer system of claim 9, wherein each of the plurality of graphical elements representing the plurality of hierarchical nodes associated with the first category of data in the first tab is operable to expand to display data underlying the represented hierarchical node.

11. The computer system of claim 8, wherein said interactive hierarchy is related to managing employee benefit information, and wherein said plurality of hierarchy levels comprise at least one level selected from a group consisting of a benefit program, a benefit plan type within said benefit program, a benefit plan within said benefit plan type, and a benefit option within said benefit plan.

12. The computer system of claim 8, wherein said information is selected from a group consisting of information about a benefit plan, eligibility information for said benefit plan, enrollment information for said benefit plan, and information about dependents enrolled in said benefit plan.

13. The computer system of claim 8, wherein said interactive hierarchy comprises a higher hierarchy level and a lower hierarchy level, wherein said higher hierarchy level comprises a parent node and said lower hierarchy level comprises at least one child node of said parent node, and wherein said method further comprises:

in response to entry of additional information associated with said parent node in a fourth region of said graphical user interface, automatically associating said additional information with each of said at least one child node.

14. The computer system of claim 8, wherein said method further comprises:

generating a hierarchical data structure based upon data entered into said graphical user interface, wherein said hierarchical data structure comprises said information associated with said selected node; and processing additional information in accordance with said hierarchical data structure to generate processed data.

15. A non-transitory computer-readable memory device having stored thereon a sequence of instructions which, when executed by a processor, causes the processor to present an interactive hierarchy and indicate entry of information therein by:

presenting said interactive hierarchy in a first area of a first region of a graphical user interface, said interactive hierarchy comprising a plurality of hierarchy levels each with at least one respective node, wherein said at least one respective node is operable to expand to reveal underlying nodes in response to a user interaction with said first region, and wherein said at least one respective node is operable to collapse to hide said underlying nodes in response to a user interaction with said first region, and wherein each of the at least one respective node and underlying nodes has a type name that indicates a hierarchy level of the plurality of hierarchy levels for the at least one respective node and underlying nodes that is presented in the first area of the first region;

presenting, in a second area of the first region, a plurality of graphical elements, each graphical element from the plurality of graphical elements corresponding to and visually associated with a node from the at least one respective node and the underlying nodes presented in the interactive hierarchy, each graphical element from the plurality of graphical elements indicating an entry of information associated with the visually associated node from the at least one respective node and the underlying nodes;

receiving an indication of a selected node of said at least one respective node;

altering a visual attribute for the selected node in the first region of the graphical user interface to indicate that the selected node is selected;

in response to receiving an indication of the selected node, presenting a plurality of areas in a second region of said graphical user interface, wherein at least one area of said plurality of areas corresponds to the selected node of said at least one respective node and presents the type name of the selected node, the second region comprising a plurality of graphical elements representing a plurality of hierarchical nodes, each hierarchical node of the second region comprising a child node of the selected node of said at least one respective node, wherein each graphical element of the second region is selectable to expand and collapse the represented hierarchical node, and wherein the at least one area corresponding to the selected node comprises input elements for the entry of information associated with the selected node;

presenting a third region of said graphical user interface, said third region comprising a task indicator including a linear sequence of plurality of graphical elements, each graphical element corresponding to an information entry or management task of a plurality of information entry or management tasks, the graphical elements of the task indicator representing a sequence of steps to complete the information entry or management tasks, and the third region further comprising a graphical object indicating one of the graphical elements of the task indicator corresponding to a current task of the plurality of information entry or management tasks, wherein the entry of information associated with the selected node is a task of the plurality of information entry or management tasks;

in response to selection of the selected node, altering the graphical object indicating one of the graphical elements of the task indicator to correspond to the entry of information associated with the selected node;

in response to the entry of said information associated with said selected node, presenting, in a third area of the first region, at least a portion of the information entered wherein the at least the portion of the information entered is visually associated with the selected node in the first region; and in response to the entry of said information associated with said selected node, altering a graphical element in the second area of the first region to indicate the entry of information associated with the selected node.

16. The non-transitory computer-readable memory device of claim 15, wherein said presenting a plurality of areas comprises:

presenting a first tab comprising a grouping of the plurality of graphical elements representing the plurality of hierarchical nodes associated with a first category of data; and presenting a second tab comprising a grouping of the plurality of graphical elements representing the plurality of hierarchical nodes associated with a second category of data, wherein said at least one area comprises at least one area from said first grouping and further comprises at least one area from said second grouping, and wherein said altering a visual attribute of said at least one area comprises presenting a respective graphical object in each area of the at least one area to indicate said entry of said information.

17. The non-transitory computer-readable memory device of claim 16, wherein each of the plurality of graphical elements representing the plurality of hierarchical nodes associated with the first category of data in the first tab is operable to expand to display data underlying the represented hierarchical node.

18. The non-transitory computer-readable memory device of claim 15, wherein said interactive hierarchy is related to managing employee benefit information, and wherein said plurality of hierarchy levels comprise at least one level selected from a group consisting of a benefit program, a benefit plan type within said benefit program, a benefit plan within said benefit plan type, and a benefit option within said benefit plan.

19. The non-transitory computer-readable memory device of claim 15, wherein said information is selected from a group consisting of information about a benefit plan, eligibility information for said benefit plan, enrollment information for said benefit plan, and information about dependents enrolled in said benefit plan.

20. The non-transitory computer-readable memory device of claim 15, wherein said interactive hierarchy comprises a higher hierarchy level and a lower hierarchy level, wherein said higher hierarchy level comprises a parent node and said lower hierarchy level comprises at least one child node of said parent node, and further comprising:

in response to entry of additional information associated with said parent node in a fourth region of said graphical user interface, automatically associating said additional information with each of said at least one child node.

21. The non-transitory computer-readable memory device of claim 15 further comprising:

generating a hierarchical data structure based upon data entered into said graphical user interface, wherein said hierarchical data structure comprises said information associated with said selected node; and processing additional information in accordance with said hierarchical data structure to generate processed data.

22. The method of claim 1, further comprising, in response to entry of said information associated with said selected node, updating the task indicator by moving the graphical object of the third region of the graphical user interface to a graphical element of the task indicator corresponding to a next task of the plurality of information entry of management tasks.

23. The system of claim 8, further comprising, in response to entry of said information associated with said selected node, updating the task indicator by moving the graphical object of the third region of the graphical user interface to a graphical element of the task indicator corresponding to a next task of the plurality of information entry of management tasks.

24. The non-transitory computer-readable memory device of claim 15, further comprising, in response to entry of said information associated with said selected node, updating the task indicator by moving the graphical object of the third region of the graphical user interface to a graphical element of the task indicator corresponding to a next task of the plurality of information entry of management tasks.

* * * * *